US006703093B2

(12) United States Patent
Foster

(10) Patent No.: US 6,703,093 B2
(45) Date of Patent: Mar. 9, 2004

(54) FRICTION WELDING

(75) Inventor: Derek John Foster, Bristol (GB)

(73) Assignee: Rolls-Royce Plc, London (GB)

( * ) Notice: Subject to any disclaimer, the term of this patent is extended or adjusted under 35 U.S.C. 154(b) by 0 days.

(21) Appl. No.: 09/987,712

(22) Filed: Nov. 15, 2001

(65) Prior Publication Data

US 2002/0061373 A1 May 23, 2002

(30) Foreign Application Priority Data

Nov. 17, 2000 (GB) .............................................. 0028183

(51) Int. Cl.$^7$ .............................................. B23K 20/12
(52) U.S. Cl. .................... 428/36.9; 428/34.1; 428/35.3; 428/940; 228/112.1; 228/114.5; 219/59.1; 219/60.2; 219/61
(58) Field of Search ........................... 228/112.1–114.5; 428/940, 36.9, 34.1, 35.3; 219/59.1, 60.2, 61

(56) References Cited

U.S. PATENT DOCUMENTS

| | | | | |
|---|---|---|---|---|
| 4,260,094 A | * | 4/1981 | Stroo | .......................... 228/112 |
| 5,213,250 A | * | 5/1993 | Simon | .......................... 228/114 |
| 5,460,317 A | | 10/1995 | Thomas et al. | .......... 228/112.1 |
| 5,495,977 A | * | 3/1996 | Hildebrandt et al. | ..... 228/112.1 |
| 2001/0017018 A1 | * | 8/2001 | Czaplicki | ................... 52/731.6 |

* cited by examiner

Primary Examiner—Harold Pyon
Assistant Examiner—Brian P. Egan
(74) Attorney, Agent, or Firm—Oliff & Berridge, PLC

(57) ABSTRACT

In one aspect the invention provides a friction welded component, and a method of manufacture for such a component, comprising a pair of upstanding tubular members (6,8) which are friction welded at their respective end cross-sections, in coaxial concentric relationship, to a surface of a thin walled member (4). A reinforcement means (10) is provided in the region between the tubular members such that loads acting on the tubular members are more evenly distributed to the thin walled member. The wall thickness of the thin walled member is substantially the same as or greater than the wall thickness of the tubular members The invention finds particular application in the fabrication of bosses to gas turbine aero-engine casings.

16 Claims, 1 Drawing Sheet

FRICTION WELDING

BACKGROUND OF THE INVENTION

This invention relates to friction welding and in particular concerns friction welding thin-walled structures.

The invention finds particular application in the manufacture of gas turbine aero-engine casings which hitherto have been manufactured from titanium, nickel or steel forgings. The manufacture of thin walled components such as aero-engine casings from metal forgings is particularly expensive in terms of material wastage and machining time. Typically ninety five per cent of forging material is removed during the machining of an engine casing forging. This low material utilisation is a consequence of the forging process since the size of load bearing reinforced features such as bosses and the like on the casing surface determine the wall thickness of the forging that is necessary for correct material flow during the forging process. For example, a forging for an engine casing having a 25 mm (1 inch) diameter boss on its surface requires a minimum wall thickness of at least 25 mm to ensure correct material flow in the region of the boss during forging. Bosses are a common feature on gas turbine aero-engine casings since they are used extensively for mounting pipes and vane spigots, for example. Boss diameters of 25 mm or more are common on casings having a wall thickness in the region of 2–5 mm. The resultant material wastage and machining time adds considerably to the manufacturing cost of thin-walled engine casing structures and adds significantly to the lead time of the machined component. One attempt to address this problem has been to manufacture gas turbine aero-engine casings from sheet material using highly accurate fusion welding techniques such as electron beam welding. However, fusion welded bosses have a number of drawbacks particularly in terms of joint strength, mechanical integrity and the cost associated with non-destructive (NDI) weld inspection. In this respect fusion welded bosses are usually unsuitable for gas turbine aero-engine casing applications and the manufacture of casings from forgings has hitherto been preferred.

Friction welding has also been proposed for joining bosses to engine casings manufactured from thin sheet material. Friction welding is the welding method of choice in many welding applications since parent material strength can be achieved at the weld joint with little or no heat affected zone. Attempts at friction welding bosses to thin walled structures such as engine casings have not been successful however, since the high forging loads generated cannot be supported by the thin walled casing when the casing material becomes plastic during the welding process. This results in the boss element punching through the thin walled casing, in a process known as "burn through", before a satisfactory weld is achieved.

SUMMARY OF THE INVENTION

According to an aspect of the invention there is provided a friction welded component comprising at least one upstanding tubular member friction welded at an end cross-section thereof to a surface of a thin walled member, and a structural reinforcement means located in at least part of the internal region bounded by the said tubular member. In this way it is possible to form a boss on a sheet of thin walled material by friction welding a tubular member to the sheet material. The reinforcement provides additional strength and support in the region of the weld and this can prevent flexure and failure of the welded joint by evenly distributing loads acting on the tubular member to the thin walled member over a wider area.

The weld energy and forging force necessary for friction welding a relatively thin walled tubular member, for instance a circular cross-section tube having a 1 mm wall thickness, is significantly less than the energy and force required to weld a solid circular cylindrical member of the same diameter, say 25 mm, since the weld contact area of the weld components is significantly less. The above aspect of the invention readily permits friction welding to be used for fabricating thin walled structures without "burn through" where reinforcement features such as bosses or the like are required.

In preferred embodiments, the friction welded component comprises a pair of upstanding concentric circular section tubular members, and preferably the annular region between the tubular members contains the reinforcement. By welding a pair of coaxial circular section tubes to a thin walled member the annular region between the tubes can be filled or fitted with an appropriate reinforcement means such that loads acting on one or both tubular members are evenly distributed to the thin walled member through the reinforcement strengthening medium. This can reduce the significance of stress concentration features at the weld joints due to the change in geometry between the respective tubular members and the thin walled member. It is preferred that the outer tubular member is substantially concentric with the inner tubular member and that the inner member has a longitudinal dimension greater than the outer member such that the tubular members and strengthening material define a stepped protrusion upstanding from the surface of the thin walled member.

Preferably, the structural reinforcement means comprises a moulded element bonded to the thin walled members and the at least one tubular member. This readily permits the region of the welded joint to be strengthened once the tubular member has been welded.

In preferred embodiments, the moulded element is moulded from a mouldable material selected from the group comprising thermosetting resins, cold cure resins and fibre reinforced composite materials. This readily permits the interior region to be filled with mouldable curable material to form a solid upstanding load bearing protrusion.

In an alternative embodiment, the reinforcement means comprises at least one hollow reinforcement element. This can improve the strength to weight ratio of the reinforced area.

In preferred embodiments, the hollow reinforcing element is selected from the group comprising metal or composite honeycomb reinforcement or foam reinforcement.

The friction welded component may comprise a solid central upstanding member friction welded at an end cross-section thereof to the said surface of the thin walled member towards the centre of the internal region bounded by the tubular member. Thus the above aspect of the invention also contemplates embodiments where one or more concentric tubular members are disposed around a solid central member.

In preferred embodiments, the wall thickness of the thin walled member is substantially the same as or greater than the thickness of the at least one tubular member. The forging force necessary for friction welding the end cross-section of a tubular member to the surface of a thin walled member can be readily supported by the thin walled member when the wall thicknesses of the weld components are substantially the same. For instance, it is only possible to friction weld a solid circular section bar having a diameter of 25 mm to a sheet of the same or similar material when the thickness of the sheet is 4 mm or greater, otherwise "burn through" occurs. In comparison the present inventors have found that it is possible to successfully friction weld a circular section tube to a sheet of the same or similar material where the wall thickness of the tube is substantially the same as the thickness of the sheet material, for instance 1 mm, but preferably in the range of 0.5–5 mm.

Preferably, the at least one tubular member is friction welded to a curved surface of the thin walled member. This readily enables this aspect of the invention to be applied to curved thin walled structures such as circular cylindrical aero-engine casings.

In preferred embodiments, the at least one tubular member is friction welded to a convex surface of the thin walled member. This readily enables tubular members to be joined to the outer surface of structures such as circular cylindrical aero-engine casings.

According to another aspect of the invention there is provided a method of friction welding thin walled structures; the said method comprising friction welding at least one tubular member to a surface of a thin walled member; the said at least one tubular member being welded at an end cross-section thereof to a surface of the said thin walled member, and providing a structural reinforcement means in at least part of the internal region bounded by the said tubular member and the said thin walled member.

According to another aspect of the invention there is a friction welded component comprising at least one upstanding tubular member friction welded at an end cross-section thereof to a surface of a thin walled member, whereby the said wall thickness of the said thin walled member is substantially the same as or greater than the thickness of the said at least one tubular member.

Another aspect of the invention provides a method of friction welding thin walled structures; the said method comprising the step of friction welding at least one tubular member to a surface of a thin walled member; the said at least one tubular member being welded at an end cross-section thereof to a surface of the said thin walled member; and, whereby the said wall thickness of the said thin walled member is substantially the same as or greater than the thickness of the said at least one tubular member.

BRIEF DESCRIPTION OF THE DRAWINGS

The invention will now be more particularly described, by way of example, with reference to the accompanying drawings, in which.

DETAILED DESCRIPTION OF THE PREFERRED

Figure 1:
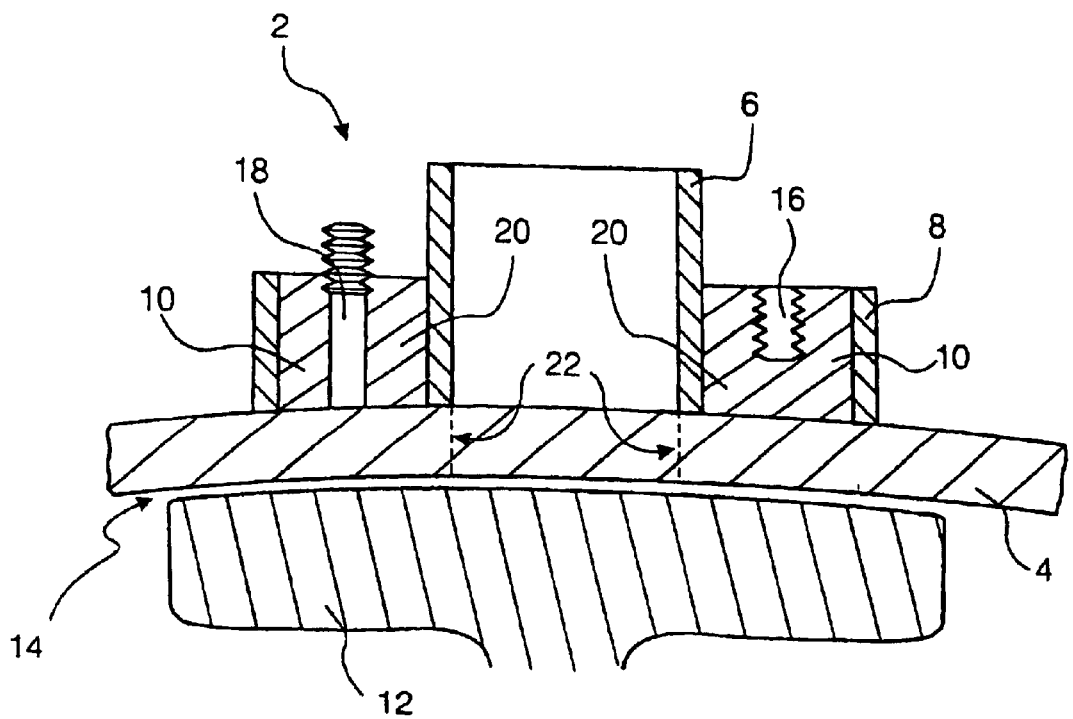
FIG. 1 is a cross-section view of a fabricated boss friction welded to a section of a circular cylindrical gas turbine aero-engine casing; and, FIG. 2 shows the fabricated boss of FIG. 1 in a perspective view.
Figure 2:
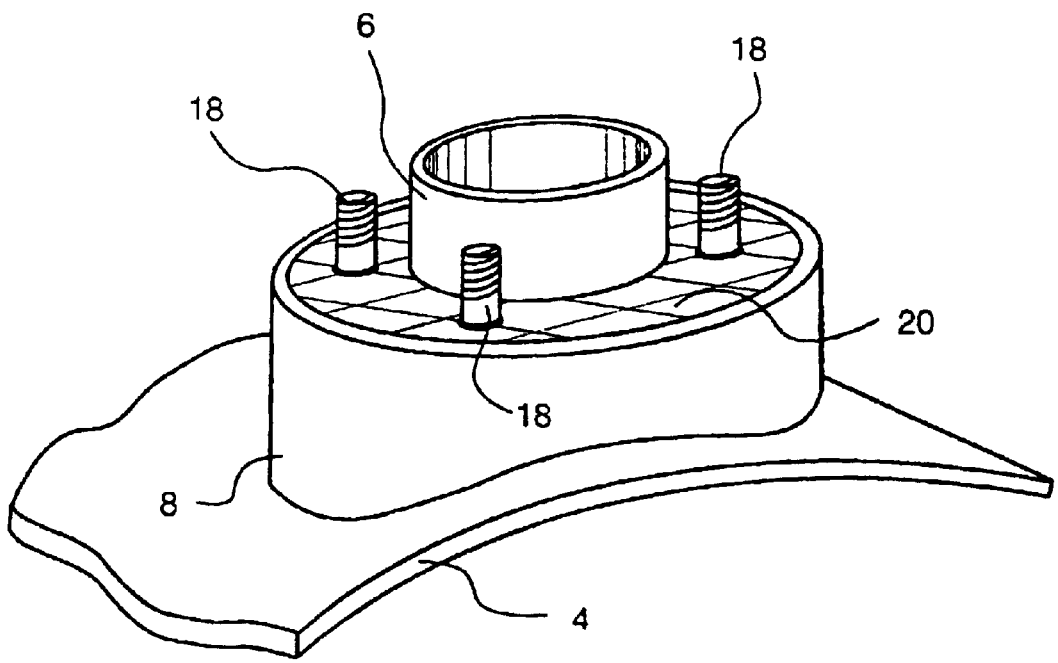

Referring now to the illustrated example in FIGS. 1 and 2, a fabricated boss, generally indicated at 2, is formed on the outer surface of a generally cylindrical casing 4. In the drawing of FIG. 1 only part of the circumference of the engine casing is shown, with the cross-section shown being in the plane normal to the longitudinal axis of the casing.

The boss 2 constitutes a strengthening feature in the form of a pipe connector on the outer surface of the casing 4 for connecting the flange (not shown) of a pipe to the casing. The fabricated boss 2 comprises a pair of concentric circular cross section tubular wall members 6,8 of unequal length with the inner tubular member 6 being approximately two or three times the length of the outer member 8. The tubular members 6,8 are friction welded at one end to the exterior convex surface of the casing 4 in a concentric coaxial relationship such that they protrude radially outwards from the casing. The tubular members have a wall thickness of 1 mm, for example, and the engine casing has a wall thickness substantially the same as or greater than the tubular members. The tubular members 6,8 and casing may be formed of any metal or metal alloy material suitable for friction welding. The material of the tubular members may be the same as that of the casing. Different but compatible materials may also be used. For example the tubular members may be steel and the casing nickel alloy. In another example the tubular members and the casing may be titanium or a titanium alloy. Dissimilar materials such as titanium and steel, and titanium and nickel result in brittle inter-metallic alloys and are incompatible for friction welding purposes.

The sequence in which the cylinders are welded is unimportant but it is preferred to weld the outer tubular member 8 first. Any friction welding method may be used to join the tubular members to the casing and although rotary inertia welding is preferred for circular symmetry other methods may be used, for instance linear or continuous drive.

Because of the high forces employed in friction welding it is necessary to support the interior surface of the casing cylinder 4 by means of a relatively massive support member 12. The support member also functions as a heat sink during friction welding and although not shown in the drawing of FIG. 1, the support member 12 may be cooled to remove heat from the weld zone.

A contact surface 14 on the member 12 is curved to precisely match the curvature of the interior surface of the casing 4 against which it held during friction welding to react the welding loads and conduct heat away from the weld zone.

In the process of friction welding the end of a circular cross-section tube to the external surface of a large diameter cylinder frictional contact does not occur around the full circumference of the tube at the onset of the welding process. Initially the end of the tube being joined only contacts the larger diameter cylinder at two diametrically opposed points on its end cross-section circumference. As the weld interface heats up and becomes plastic material upset occurs and the contact area between the two components become progressively larger until full circumferential contact is achieved, whereupon welding is virtually completed. In the context of friction welding the term "upset" is understood to mean the reduction in the dimensions of the two components in the direction of the applied force when the components are forced together.

When the components are forced together the forge force exerted by the tubular member 6,8 on the outer surface of the casing 4 is reacted by the support member 12 acting against the interior surface of cylinder 4 immediately below the weld zone. The support member acts as a massive heat sink and maintains an even temperature at the interior surface of cylinder 4. By ensuring that the transfer of heat from the friction heating regions is sufficient the tubular member 6,8 being welded does not fully penetrate the wall of the cylinder 4 and the heat affected zone of the weld is contained within the region of the weld.

Once welding has taken place, upset material or weld flash (not shown) may be removed from both external and internal joint lines and the space between the two tubular members cylinders then filled with a strengthening medium 20 selected from a range of possible media. For example, if a solid medium is preferred a metal alloy may be used or a thermosetting or cold cure resin, these resins may be fibre reinforced for added strength. Alternatively the medium may be selected from a range of hollow materials such as a foamed substance (closed cell or open cell) or a honeycomb reinforcement structure.

If the strengthening medium has sufficient inherent strength then attachment points may be formed, for example by embedding threaded inserts, as at 16 in FIG. 1. Alternatively or additionally mounting studs 18 may also be friction welded to the cylinder 4 in the space between the two concentric cylinders 6,8 and then partially encapsulated by the strengthening medium.

External attachments such as the pipe fitting mentioned above may be attached to the casing structure 4 by means of the studs 18 or bolts (not shown) which engage the inserts 16.

In the example described, the engine casing is drilled to provide an aperture in the casing, as indicated by the dashed lines 22, in the region bounded by the inner tubular member 6.

In the illustrated embodiment the large diameter cylinder 4 forms the basis for a fabricated casing for a gas turbine engine module. However, the present invention may employed to in the manufacture other kinds of structures particularly where local areas of reinforcement are required in or on thin-walled structures.

Although aspects of the invention have been described with reference to the embodiments shown in the accompanying drawings it is to be understood that the invention is not limited to those precise embodiments and various changes and modifications may be effected without exercise of further inventive skill and effort. For example, the tubular members could have cross-sections other than circular or the welded joint may include an intermediate tubular member between an inner and outer member.

What is claimed is:

1. A friction welded component comprising at least one upstanding tubular member having an end surface that is friction welded to a thin walled member at a first wall surface separated from a second wall surface by a wall thickness of said thin walled member and molded element means in at least part of an internal region bounded by said end surface of said tubular member and said first wall surface of said thin walled member, wherein the wall thickness of said thin walled member is substantially the same as or greater than a tube thickness of said at least one tubular member and not greater than 5 mm, and said molded element means engages the second wall surface of said thin walled member.

2. The friction welded component according to claim 1, comprising a pair of upstanding coaxial tubular members friction welded to said thin walled member with an annular region between the coaxial tubular members containing said reinforcement means.

3. A friction welded component comprising:
   at least one upstanding tubular member having an end surface;
   molded element means for structural reinforcement; and
   a thin walled member having a first wall surface and a second wall surface separated by a wall thickness of said thin walled member, said wall thickness not greater than 5 mm, wherein said tubular member attaches along said end surface to said first wall surface of said thin walled member by a friction weld,
said molded element means engages said second wall surface and is located in at least part of an internal region bounded by said end surface of said tubular member and said first wall surface of said thin walled member, and
the end surface is substantially tangent to the first wall surface.

4. The friction welded component according to claim 3, wherein the wall thickness of said thin walled member is substantially the same as or greater than a tube thickness of said at least one tubular member.

5. The friction welded component according to claim 3, wherein the wall thickness of said thin walled member is substantially in the range of 0.5 mm–5 mm.

6. The friction welded component according to claim 3, wherein said molded element means comprises a molded element bonded to said thin walled members and said at least one tubular member.

7. The friction welded component according to claim 6, wherein said molded element is molded from a moldable material selected from the group consisting of thermosetting resins, cold cure resins and fiber reinforced composite materials.

8. The friction welded component according to claim 3, wherein said molded element means comprises at least one hollow reinforcing element.

9. The friction welded component according to claim 8, wherein said hollow reinforcing element is selected from the group consisting of a honeycomb reinforcement and a foam reinforcement.

10. The friction welded component according to claim 3, wherein said at least one tubular member is friction welded to a curved surface of said thin walled member.

11. The friction welded component according to claim 10, wherein said at least one tubular member is friction welded to a convex surface of said thin walled member.

12. The friction welded component according to claim 3, further comprising a central upstanding member that is friction welded at the end thereof to said surface of said thin walled member towards the center of said internal region.

13. The friction welded component according to claim 12, wherein said central member and said at least one tubular member comprise a pair of respective upstanding concentric circular section tubular members.

14. The friction welded component according to claim 13, wherein said molded element means is disposed in an angular region between said tubular members.

15. A method of friction welding thin walled structures, said method comprising the steps of:
    friction welding an end surface of at least one tubular member to a first wall surface of a thin walled member, wherein the end surface of said at least one tubular member is substantially flush to the first wall surface of said thin walled member, the first wall surface of said thin walled member is separated from a second wall surface by a wall thickness of said thin walled member, the first and second wall surfaces are perpendicular to the wall thickness, said wall thickness is not greater than 5 mm; and
    providing molded element means for structural reinforcement in at least part of an internal region bounded by said end surface of said tubular member and said first wall surface of said thin walled member, said molded element means engages the second wall surface of said thin walled member.

16. A method of friction welding thin walled structures said method comprising the steps of:

friction welding an end surface of at least one tubular member to a first wall surface of a thin walled member, wherein the end surface of said at least one tubular member is substantially tangent to the first wall surface of said thin walled member; the first wall surface of said thin walled member is separated from a second wall surface by a wall thickness of said thin walled member, the wall thickness of said thin walled member is substantially the same as or greater than a tube thickness of said at least one tubular member and not greater than 5 mm; and providing molded element means for structural reinforcement in at least part of an internal region bounded by said end surface of said tubular member and said first wall surface of said thin walled member, said molded element means engages the second wall surface of said thin walled member.

* * * * *